May 3, 1960 S. T. COMFORT 2,935,161

SAFETY SYSTEM FOR LOAD ELEVATING VEHICLES

Filed Nov. 7, 1957 2 Sheets-Sheet 1

Inventor
Samuel T. Comfort
by Joseph E. Kerwin
Attorney

SAFETY SYSTEM FOR LOAD ELEVATING VEHICLES
Filed Nov. 7, 1957
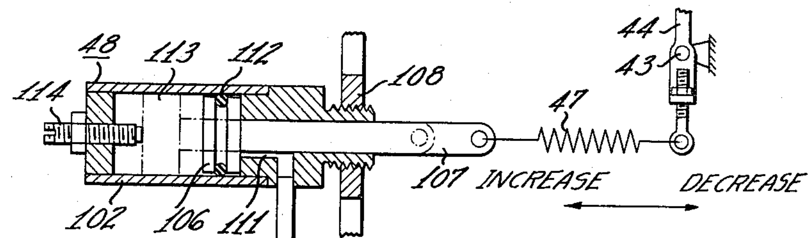
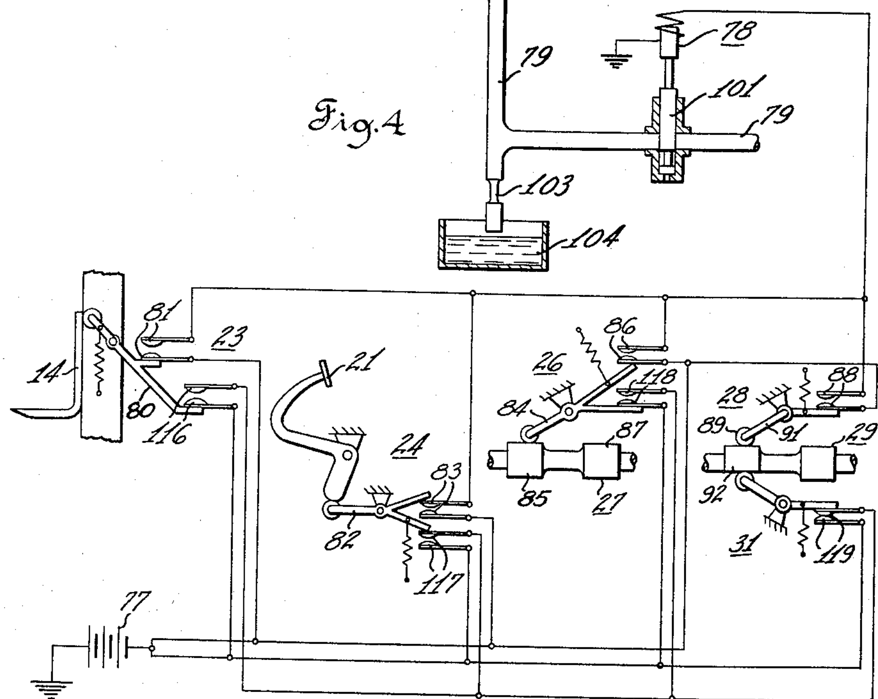
Fig. 4
Fig. 5
Inventor
Samuel T. Comfort
By Joseph E. Kerwin
Attorney United States Patent Office 2,935,161

Patented May 3, 1960

2,935,161

SAFETY SYSTEM FOR LOAD ELEVATING VEHICLES

Samuel T. Comfort, Homewood, Ill., assignor to Allis-Chalmers Manufacturing Company, Milwaukee, Wis.

Application November 7, 1957, Serial No. 695,019

5 Claims. (Cl. 187—9)

This invention relates to automatically regulating vehicle travel when a load carried by the vehicle is elevated above a predetermined height.

Load elevating and transporting vehicles such as fork trucks cannot be moved safely at high speed when the load being transported is elevated to a substantial height. If the load is elevated the vehicle is easily tipped over forwardly or on its side if the operator suddenly tries to stop or turn while traveling at high speed. High speed travel with an elevated load has been found so dangerous to truck, load and operator that it is desirable to prevent operation of the power plant of the vehicle if an attempt is made to operate the vehicle in high gear when the load is in an elevated condition.

One method of controlling the travel speed of the vehicle is that of controlling engine speed. However, it has been found desirable to run the engine at high speed with the load support elevated when the latter is being raised or lowered to deposit or pick up a load from the tier or stack since the pump for supplying pressure fluid to the load support lift ram is driven directly by the engine. By permitting high engine speed, the load is fully raised and lowered without loss of time. Also it is desired, from a time saving standpoint, to permit the operator to shift to reverse gear preparatory to moving the truck away from the stack once the load has been picked up from or deposited at a height above a predetermined maximum height for high speed travel. Thus it is desired to provide a safety system of the type hereinbefore described which would be inoperative so long as the power train is not in power transmitting condition.

It is an object of this invention to provide an improved automatic safety system for a load elevating vehicle which will limit vehicle speed when the load is elevated to such a height that a high rate of speed would be dangerous.

It is a further object of this invention to provide an automatic safety system of the type hereinbefore described which prevents operation of the power plant propelling the vehicle if an attempt is made to operate the vehicle in high gear when the load is elevated.

It is a further object of this invention to automatically control the speed of a load elevating vehicle when the load is above a predetermined height by limiting the speed of the power plant propelling the vehicle.

It is a further object of this invention to provide automatic means for reducing engine speed of a lift truck having change speed transmission when the carriage is elevated above a predetermined height except when the power train is not in power transmitting condition.

These and other objects and advantages of this invention will be apparent to those skilled in the art when the following description is read together with the accompanying drawings in which:

Fig. 4 is a schematic view of the automatic safety control system of this invention; and Fig. 5 is a schematic view of the power train of the fork truck shown in Fig. 1.

Figure 1:
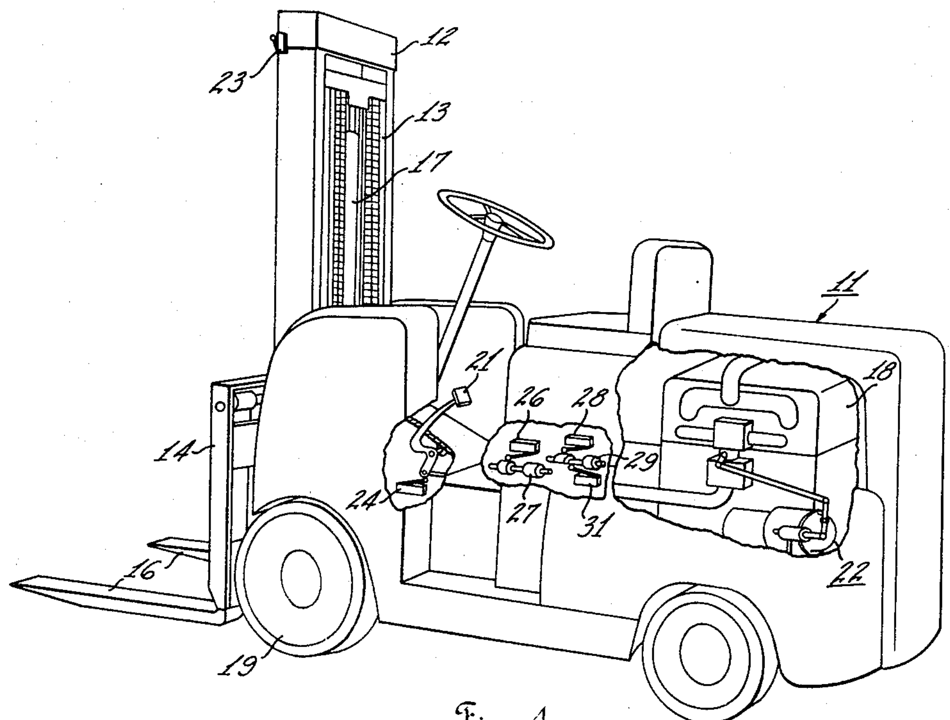
Fig. 1 is a perspective view of a fork truck incorporating this invention.

Referring to Fig. 1, a fork truck 11 is shown with portions broken away to better illustrate the present invention. A conventional outer mast 12 is pivotally connected to the forward end of the truck. An inner mast 13 is disposed within the outer mast and a load support including a carriage 14 carrying a pair of forks 16 is reciprocably mounted on the inner mast 13. The inner mast 13 and load carrying carriage are elevated by a hydraulic ram 17.

As will be more specifically explained in discussing Fig. 5, a power plant in the form of an internal combustion engine 18 drives running gear including front traction wheels 19 through a power train shown in Fig. 5. Power from the engine is selectively controlled through a foot operated clutch pedal 21.

The speed of the engine 18 is controlled by a centrifugal governor mechanism 22 which is adjusted to high and low maximum speed conditions by a speed control responsive to sensing means in the form of electrical switches. A first electrical switch 23 is installed on the outer mast to be actuated by the carriage when it is elevated to a predetermined height such as 48 inches. Switch 23 constitutes a height sensing means. A second electrical switch 24 is actuated by the clutch pedal 21 when the latter is in an engaged position. A third electrical switch 26 is actuated when a forward-reverse gear shift rod 27 is in either a forward or reverse position of adjustment. A fourth electrical switch 28 is actuated when a high-low gear shift rod 29 is adjusted to either a high or low condition. Switches 24, 26 and 28 constitute power sensing means since these three switches are actuated when the running gear is driven by the engine. Other sensing means in the form of switch 31 is actuated only when the high-low shift rod is shifted to a high speed condition.

Figure 2:
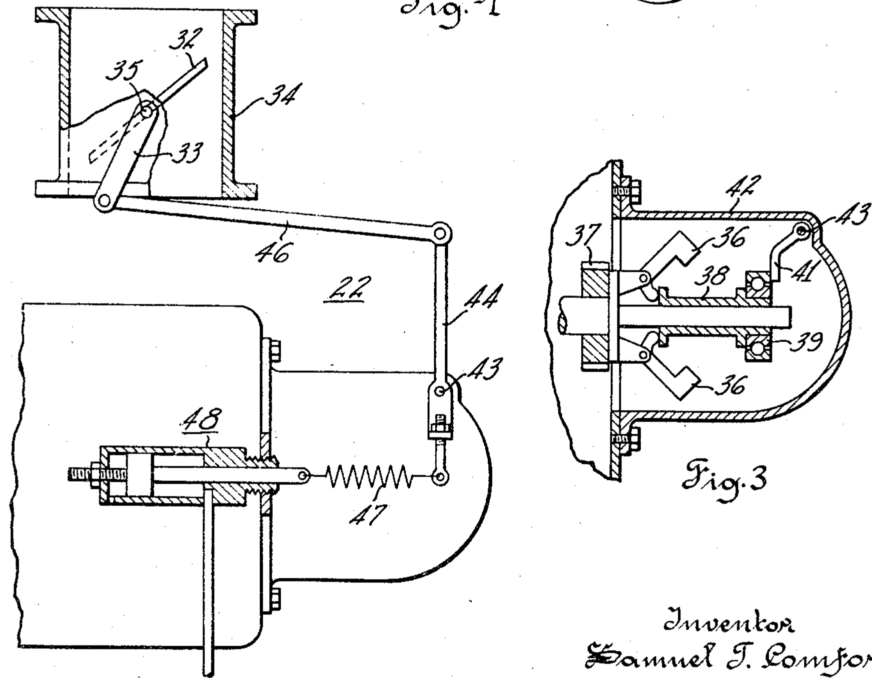
Fig. 2 is a view of the governor for the vehicle engine of the truck shown in Fig. 1.
Figure 3:
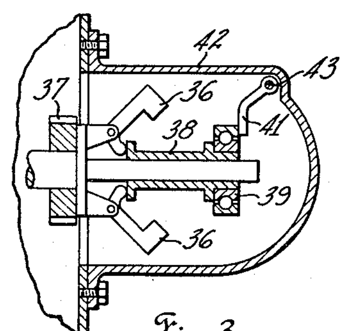
Fig. 3 is a section view of the centrifugal governor of the vehicle engine.

Referring to Figs. 2 and 3, the governor mechanism 22 includes a butterfly valve 32 nonrotatably secured to a lever arm 33 which is pivoted to the engine intake manifold 34 through a pin 35. A pair of centrifugal weights 36 are pivoted to a gear 37 driven by the timing gear, not shown. As engine speed increases, the weights swing radially outward shifting a sleeve 38 away from gear 37. This shifting movement also moves a bearing 39 which has an outer raceway abutting a crank arm 41. Crank arm 41 is pivotally mounted on governor housing 42 through a pivot pin 43 which extends to the outside of the housing 42 where lever 44 is secured to it. The top end of the lever is pivotally connected to a link 46 which in turn is pivotally connected to the lever arm 33.

Outward swinging movement of the weights 36 is resisted by a spring 47 attached to lever 44. The tension of the spring 47 is adjusted by a speed control including a hydraulically actuated control 48 which is attached to spring 47.

Referring to Fig. 5, the truck engine 18 drives a shaft 51 and drives a hydraulic pump 52 which supplies pressure fluid to lift cylinder 17 through a conventional control valve 53. The power train of the vehicle includes a transmission 54 which has an input shaft 56 connected to the engine shaft 51 by a conventional automotive friction clutch 57. The forward-reverse shift rod 27 establishes forward drive through gears 58, 59 and reverse drive through gears 61, 62, 63 upon shifting to the left and right, respectively. The shift rod 27 establishes drive between input shaft 56 and gears 58 and 61 through a shift arm 64 and shift collar 66, these components being conventional constant mesh transmission members.

High vehicle speed is established by moving shift rod 29 to the left thereby connecting shaft 67 to transmission output shaft 68 through gears 69, 71 and low vehicle speed is established by shifting rod 29 to the right thereby connecting shaft 68 to gear 72 which effects drive from shaft 67 to shaft 68 through gears 73 and 72. Transmission output shaft is connected in driving relation to the traction wheels 19 through a conventional differential 74 and final drive shafts 76.

Referring to Fig. 4, an electrical circuit is shown connecting the first, second, third and fourth electrical switches 23, 24, 26, 28, in parallel between an electrical power source 77 and an electrically responsive control means in the form of a solenoid valve 78. The solenoid valve 78 controls flow of oil through conduit 79 from the engine forced lubrication system to the hydraulically operated engine control 48.

When the carriage 14 is elevated above a predetermined height, lever 80 is pivoted opening contacts 81 of switch 23. When the clutch 57 is engaged, as shown in Fig. 4, the clutch pedal 21 actuates lever 82 to open contacts 83. As shown in Fig. 4, forward-reverse gear shift rod 27 is in reverse gear adjustment and in this condition increased diameter portion 85 pivots lever 84 of switch 26 thereby opening contacts 86. If the shift rod is shifted to the left to a forward gear adjustment the increased diameter portion 87 would cause contacts 86 to open. In an intermediate neutral position of shift rod 27 the spring biased lever 84 would close contacts 86. The switch 28 operates in a manner similar to switch 26 with contacts 88 opening when the high-low gear shift rod 29 is moved from neutral to high or low gear positions. As shown in Fig. 4, the high-low shift rod 29 is in a low gear condition wherein roller 89 on lever 91 has rolled onto increased diameter portion 92 thereby opening contacts 88.

As shown in Fig. 4, the fork truck is moving in reverse in low gear with the carriage 14 raised above 48 inches. The automatic safety system has adjusted the governor to a slow engine speed condition, that is, the maximum engine speed has been lowered.

The maximum governed engine speed is reduced when the load support is above 48 inches, the transmission is in high or low and in forward or reverse and the clutch is engaged. This is achieved by switches 23, 24, 26 and 28 being opened thereby breaking the electrical circuit to solenoid valve 78. The solenoid valve 78 is normally closed, as is shown in Fig. 4, and in this condition the spool 101 blocks the flow of oil in passage 79 to hydraulic actuator 48. When valve 78 closes, the oil in the chamber of cylinder 102 bleeds through restrictor 103 to the reservoir 104 thereby permitting spring 47 to pull piston 106 and piston rod 107 to the right. In this condition, the governor is at a decreased maximum engine speed adjustment. The lower maximum speed adjustment may be changed by screwing the hydraulic actuator 48 in or out of flange 108 of the governor housing 42.

When one of the four conditions which open switches 23, 24, 26 and 28 are not present, the valve 78 will be energized and oil under pressure will flow through conduit 79 through groove 111 and force the piston 106 and its O-ring 112 to move to the right to a position shown in dot-dash lines 113. The upper limit of maximum engine speed may be adjusted through set screw 114. The restrictor 103 is of such a size that sufficient pressure is maintained in line 79 when valve 78 is open to actuate piston 106.

It has been found desirable to prevent operation of the truck in high gear when the carriage 14 is raised above 48 inches and a special ignition coil circuit is provided which is broken when an attempt is made to operate the truck in forward or reverse high gear with the carriage above 48 inches. The switches 23, 24 and 26 are double pole switches, the second pole operating contacts 116, 117 and 118. Switch 31 is opened only when the shift rod 29 is in a high gear shifted condition. The contacts 116, 117, 118 and contacts 119 of switch 31 are connected in parallel between the power source 77 and an ignition coil 121. Thus when the carriage 14 is above 48 inches, the clutch 57 is engaged, the transmission is in forward or reverse high gear, electrical current will not flow to the ignition coil 121, and the engine will stop running.

The switch 24 is provided so that the operator may shift into low reverse, while the load is being raised or lowered, preparatory to backing away from the point of depositing or picking up of the load so as to be ready to move the truck with least delay without decreasing full engine speed which is needed to operate the engine driven pump 52 to give fast carriage operation.

This invention provides an automatic safety system of particular utility in lift trucks whereby maximum engine speed is reduced when the truck is operating the carriage above a predetermined height. The system permits the operator to shift to low reverse while the load is being raised or lowered without decreasing engine speed so long as the clutch is disengaged. Also, the engine is stopped if an attempt is made to move the truck in the high speed range with the carriage elevated above the predetermined height.

This invention relates to an automatic safety system for limiting the speed of the engine of a truck employed to carry an elevatable load support 14. The automatic reduction in engine speed is effected through a control member 107 associated with the governor 22 of the engine which is adjustable between high and low maximum engine speed positions by an electrohydraulic control mechanism. The electrical portion of the control mechanism includes a source of electrical energy 77, switching means including parallel connected switches 81, 83, 86 and 88 carried by the vehicle and associated respectively with the load support 14, clutch 57, shift rod 27 and shift rod 29, and an electric actuator in the form of the solenoid of soleniod valve 78. The hydraulic portion of the electrohydraulic control mechanism includes the valve spool 101, fluid conduit 79 and hydraulic actuator for control member 107 in the form of piston 106 and cylinder 102. The rollers and levers of switches 23, 24, 26 and 28 together with the load support 14, clutch pedal 21, shift rod 27 and shift rod 29 constitute a plurality of means for actuating the mentioned switches, respectively.

It should be understood that it is not intended to limit this invention to the particular forms and details described hereinabove and that the invention includes such other forms and modifications as are embraced by the scope of the appended claims.

What is claimed is:

1. In a vehicle carrying an elevatable load support and having running gear driven by a power plant through a power train, an automatic safety system for controlling operation of said power plant comprising: a load support height sensing means actuated when said load support is elevated to a predetermined height, power sensing means actuated by said power train when the latter is in power transmitting relation with said running gear, said sensing means being connected in parallel, a speed limit control for said power plant movable between high and low positions of maximum permissible speed adjustment of said power plant, control means associated with both said sensing means and said speed limit control operative to move the latter to its low position of maximum permissible speed adjustment when both said sensing means are actuated and to its high position of maximum permissible speed adjustment when less than both of said sensing means are actuated.

2. In a vehicle carrying an elevatable load support and having running gear driven by a power plant through a power train including a variable speed transmission, an automatic safety system for controlling operation of said power plant comprising: a height sensing means actuated by said load support when the latter is elevated to a predetermined height, power sensing means actuated by said power train when the latter is in power transmitting relation with said running gear, said height and power sensing means being connected in parallel, other sensing means actuated when said transmission is adjusted to effect a vehicle speed greater than a predetermined low, a speed limit control for said power plant movable between high and low positions of maximum permissible speed adjustment of said power plant, control means associated with said height and power sensing means and said speed limit control operative to move the latter to its low position of maximum permissible speed adjustment when both said height and power sensing means are actuated and to its high position of maximum permissible speed adjustment when less than both of said height and power sensing means are actuated and means for stopping said power plant when said height, power and other sensing means are actuated.

3. In a vehicle carrying an elevatable load support and having a governor controlled engine driving running gear through a power train including a clutch, an automatic safety system for limiting the speed of said engine comprising: a control member associated with the governor of said engine adjustable to high and low maximum engine speed positions; a control mechanism for said control member including a source of electrical energy, switching means including a pair of parallel connected switches carried by said vehicle and associated, respectively, with said load support and clutch, and electrically responsive means for adjusting said control member to a high maximum engine speed condition when one of said switches is closed; means for opening one of said switches when said load support is elevated beyond a predetermined height; and means for opening the other of said switches when said clutch is engaged, said control member being adjusted to a low maximum engine speed condition when both of said switches are open.

4. The system set forth in claim 3 wherein said electrically responsive means includes a hydraulic actuator connected in motion transmitting relation with said control member, a hydraulic circuit for operating said hydraulic actuator and a solenoid valve for controlling flow of fluid in said hydraulic circuit.

5. In a vehicle carrying an elevatable load support and having a governor controlled engine driving running gear through a power train, an automatic safety system for limiting the speed of said engine comprising: a hydraulically actuated control member associated with the governor of said engine adjustable to high and low maximum engine speed positions; a hydraulic pressure fluid control means for operating said control member including a fluid circuit and a valve; an electrical control circuit including a source of electrical energy, switching means associated with said load support and an electric actuator; means connecting said electric actuator in motion transmitting relation with said valve; and means for actuating said switching means when said load support is elevated beyond a predetermined height thereby causing said electrical control circuit and fluid control means to adjust said control member to a low maximum engine speed position.

References Cited in the file of this patent

UNITED STATES PATENTS 2,790,513 Draxler ---------------- Apr. 30, 1957